United States Patent
Koganti et al.

(10) Patent No.: US 12,359,753 B2
(45) Date of Patent: Jul. 15, 2025

(54) COEXTRUDED POLYETHYLENE PIPE AND METHODS OF MAKING AND USING SAME

(71) Applicant: Chevron Phillips Chemical Company LP, The Woodlands, TX (US)

(72) Inventors: Nikhil Koganti, The Woodlands, TX (US); Heath Casteel, The Woodlands, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 408 days.

(21) Appl. No.: 17/829,632

(22) Filed: Jun. 1, 2022

(65) Prior Publication Data

US 2023/0039633 A1 Feb. 9, 2023

Related U.S. Application Data (60) Provisional application No. 63/225,186, filed on Jul. 23, 2021.

(51) Int. Cl.
| | |
|---|---|
| *F16L 9/133* | (2006.01) |
| *B29C 48/09* | (2019.01) |
| *B29C 48/21* | (2019.01) |
| *B29K 105/00* | (2006.01) |

(52) U.S. Cl.
CPC ............ *F16L 9/133* (2013.01); *B29C 48/09* (2019.02); *B29C 48/21* (2019.02); *B29K 2023/06* (2013.01); *B29K 2105/0032* (2013.01)

(58) Field of Classification Search
CPC .......... F16L 9/133; B29C 48/09; B29C 48/21; B29K 2023/06; B29K 2105/003

USPC ........................................................ 138/140
See application file for complete search history.

(56) References Cited

U.S. PATENT DOCUMENTS

| | | | |
|---|---|---|---|
| 9,915,382 B1* | 3/2018 | Lueghamer | F16L 9/14 |
| 2013/0323450 A1* | 12/2013 | DesLauriers | G01N 3/24 |
| | | | 428/36.9 |
| 2015/0345670 A1* | 12/2015 | Proof | C08K 5/34924 |
| | | | 138/137 |

OTHER PUBLICATIONS

"PolarPipe White-Shell Polyethylene Pipe," Performance Pipe, a Division of Chevron Phillips Chemical Company LP, Bulletin-PP-XXX, Apr. 2021, 1 pp., www.performancepipe.com.
"TKP-REFLEX: Sunbeam Reflector," https://web.archive.org/web/20201026032430/https://www.tkp.mx/tkp-reflex, Oct. 26, 2020, 2 pages, TKP Inc.

* cited by examiner

*Primary Examiner* — David R Deal
(74) *Attorney, Agent, or Firm* — Conley Rose, P.C.; Rodney B. Carroll (57) ABSTRACT

A pipe having an inner layer and an outer layer. The inner layer includes a first material having a first hydrostatic design basis (HDB), and the outer layer is coextruded with the inner layer and includes a second material having a second HDB. The second HDB is greater than or equal to the first HDB, and the first HDB and the second HDB are as specified in ASTM Test Method D2387. Also provided re methods of making and using the pipe.

11 Claims, 5 Drawing Sheets

| SELECTING THICKNESS AND DIAMETER OF INNER LAYER SUCH THAT SAME PIPE, ABSENT THE OUTER LAYER, PROVIDES SAME PIPE PRESSURE RATING THAT IS GREATER THAN OR EQUAL TO DESIGN PRESSURE RATING OF THE PIPE FOR ABOVE-GROUND APPLICATION, SUCH THAT PIPE HAS PRESSURE RATING GREATER THAN DESIGN PRESSURE RATING | — 410 |

↓

| COEXTRUDING INNER LAYER AND OUTER LAYER TO PRODUCE PIPE, SUCH THAT OUTER LAYER COMPLETELY COVERS OUTSIDE SURFACE OF INNER LAYER, WHEREIN INNER LAYER COMPRISES FIRST MATERIAL HAVING FIRST HYDROSTATIC DESIGN BASIS (HDB), AND WHEREIN OUTER LAYER COMPRISES SECOND MATERIAL HAVING SECOND HDB | — 420 |

```
REPLACING AN EXISTING OR DESIGNED PIPE WITH AN ABOVE-GROUND
PIPE, WHEREIN THE ABOVE-GROUND PIPE COMPRISES:
AN INNER LAYER, WHEREIN THE INNER LAYER COMPRISES A FIRST
   MATERIAL HAVING A FIRST HYDROSTATIC DESIGN BASIS (HDB); AND
AN OUTER LAYER, WHEREIN THE OUTER LAYER IS COEXTRUDED WITH
   THE INNER LAYER, AND WHEREIN THE OUTER LAYER COMPRISES A
   SECOND MATERIAL HAVING A SECOND HDB.
WHEREIN THE SECOND HDB IS GREATER THAN OR EQUAL TO THE
   FIRST HDB.
WHEREIN THE EXISTING OR DESIGNED PIPE HAS AN EXISTING OR
   DESIGNED WORKING PRESSURE RATING, AND
WHEREIN A WORKING PRESSURE RATING OF THE ABOVE-GROUND
   PIPE IS GREATER THAN OR EQUAL TO THE EXISTING OR DESIGNED
   WORKING PRESSURE RATING
```
— 510

COEXTRUDED POLYETHYLENE PIPE AND METHODS OF MAKING AND USING SAME

CROSS-REFERENCE TO RELATED APPLICATIONS

The present application is a non-provisional of and claims priority to U.S. Provisional Patent Application No. 63/225,186 filed Jul. 23, 2021 and entitled "Coextruded Polyethylene Pipe and Methods of Making and Using Same," which application is incorporated by reference herein in its entirety.

STATEMENT REGARDING FEDERALLY SPONSORED RESEARCH OR DEVELOPMENT

Not applicable.

TECHNICAL FIELD

The present disclosure relates to pipe; more specifically, the present disclosure relates to pipe (e.g., polyethylene pipe) for above-ground applications; still more specifically, the present disclosure relates to pipe for above-ground applications comprising an inner layer and an outer layer, wherein the outer layer comprises a second material having a hydrostatic design basis (HDB) that is greater than or equal to a HDB of a first material of the inner layer, and wherein the outer layer provides for decreased solar absorptivity relative to a same pipe absent the outer layer.

BACKGROUND

A need exists for systems and methods for reducing temperature fluctuations and pipe surface temperatures during piping applications.

SUMMARY

Herein disclosed is a pipe comprising: an inner layer, wherein the inner layer comprises a first material having a first hydrostatic design basis (HDB); and an outer layer, wherein the outer layer is coextruded with the inner layer, and wherein the outer layer comprises a second material having a second HDB, wherein the second HDB is greater than or equal to the first HDB, wherein the first HDB and the second HDB are as specified in ASTM Test Method D2387.

Also disclosed herein is a method of making a pipe for an above-ground application, the method comprising: coextruding an inner layer and an outer layer to produce the pipe, such that the outer layer completely covers an outside of the inner layer, wherein the inner layer comprises a first material having a first hydrostatic design basis (HDB), and wherein the outer layer comprises a second material having a second HDB, wherein the second HDB is greater than or equal to the first HDB, wherein the first HDB and the second HDB are as specified in ASTM Test Method D2387; and wherein a thickness and diameter of the inner layer are selected such that a same pipe, absent the outer layer, provides a same pipe pressure rating that is greater than or equal to a design pressure rating of the pipe for the above-ground application, such that the pipe has a pressure rating greater than the design pressure rating.

Further disclosed herein is a method comprising: replacing an existing or designed pipe with an above-ground pipe comprising: an inner layer, wherein the inner layer comprises a first material having a first hydrostatic design basis (HDB); and an outer layer, wherein the outer layer is coextruded with the inner layer, and wherein the outer layer comprises a second material having a second HDB, wherein the second HDB is greater than or equal to the first HDB, wherein the first HDB and the second HDB are as specified in ASTM Test Method D2387, and wherein the existing or designed pipe has an existing or designed working pressure rating and wherein a working pressure rating of the above-ground pipe is greater than or equal to the existing or designed working pressure rating.

BRIEF DESCRIPTION OF THE DRAWINGS

The detailed description will reference the drawings briefly described below, wherein like reference numerals represent like parts, unless otherwise indicated.

DETAILED DESCRIPTION

Depending on the geographic location, above-ground piping applications may be subject to significant temperature fluctuations. These temperature fluctuations may reduce pressure capability, increase rate of attack from certain oxidizing chemicals and subject the pipe to thermal expansion and contraction.

These temperature fluctuations have been identified while using, for example, black polyethylene (PE) pipe for above-ground applications. Users have attempted to paint the surface of the black pipe white in an effort to mitigate the solar radiation absorption of the pipe; however, such paint must be reapplied on a frequent basis due to the inability of the paint to adhere to the pipe outer surface.

As noted above, above-ground piping applications may be subject to significant temperature fluctuations, which can result in reduced pressure capability, increased rate of attack from certain oxidizing chemicals, and subjecting of the pipe to thermal expansion and contraction. Via this disclosure, a co-extruded shell or "outer layer" or "jacket" (e.g., a white co-extruded shell or outer layer) is utilized to reduce temperature fluctuations. A standard co-extruder can be utilized, in embodiments, to produce the shell or outer layer over a core pipe provided by an "inner layer". In embodiments, polyethylene designated as PE4710 White Compound (e.g., polyethene compounded with white colorant or pigment and conforming with the Plastic Pipe Institute's (PPI) 4710 material designation) is utilized as a non-pressure rated, coextruded white shell outer layer on polyethylene pipe inner layer for aboveground piping to lower pipe surface temperature. In such applications, the pipe can be produced with an external white shell or outer layer made out of a PE4710 white compound that is simultaneously co-extruded with the core PE pipe provided by the inner layer. In applications that require pressure, the pipe can be designed so that the core (e.g., PE) pipe provided by the inner layer contains the pressure (i.e., provides a needed or design working pressure rating for a given application) and the white shell outer layer is treated as a non-pressure rated shell to cover the (e.g., PE) pipe inner layer.

The herein disclosed pipe can be designed and/or utilized for applications in which the pipe is above the ground and not buried in the soil, including (but not limited to): mining—tailings and slurries, oil and gas (O&G) producing, gathering, transport, and distribution applications, and other above-ground industrial applications that may be subject to demanding fluctuations in temperature. Pipe 100 can be particularly suitable for above-ground piping applications in which the pipe 100 is exposed to extended periods of direct sunlight exposure. Although particularly suitable for above-ground applications, use of the pipe of this disclosure below ground is also envisioned in embodiments, and such below-ground use is thus to be understood to be within the scope of this disclosure.

The outer layer (e.g., a white outer layer) is operable to minimize solar radiation absorption, thus lowering pipe surface temperature. This reduction in temperature reduces the effect (i.e., reduction) on the pressure capability of the pipe and the effect of certain oxidizing chemicals. In addition, the outer layer can serve to reduce thermal expansion and contraction.

The term "above-ground" with reference to "above-ground" pipe or "above-ground" applications, as utilized herein, indicates pipe having at least a portion of an outer surface of the pipe that is above ground level, and thus exposed to thermal radiation, and applications employing such pipe, respectively. Accordingly, above-ground pipe includes pipe having at least a portion (e.g., 10, 20, 30, 40, 50, 60, 70, 80, or 90%, or more) of the outer surface of the pipe buried or below ground (and thus not directly impacted by solar radiation).

Figure 2:
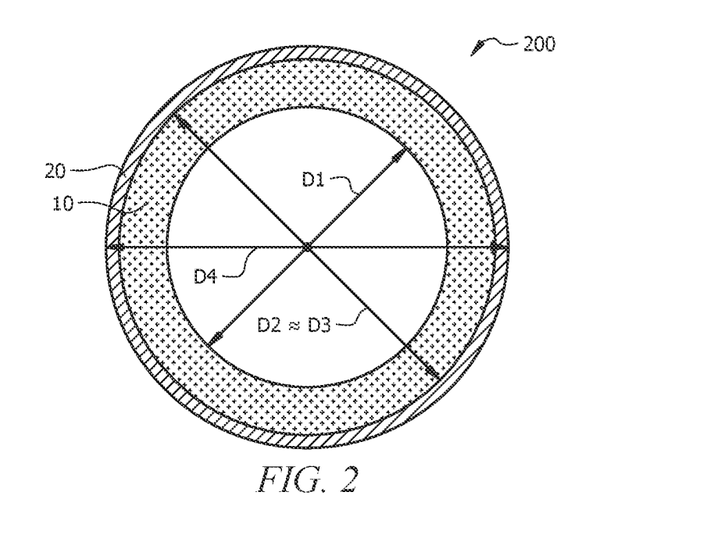
FIG. 2 is a schematic cross section of the pipe of FIG. 1.
Figure 3:
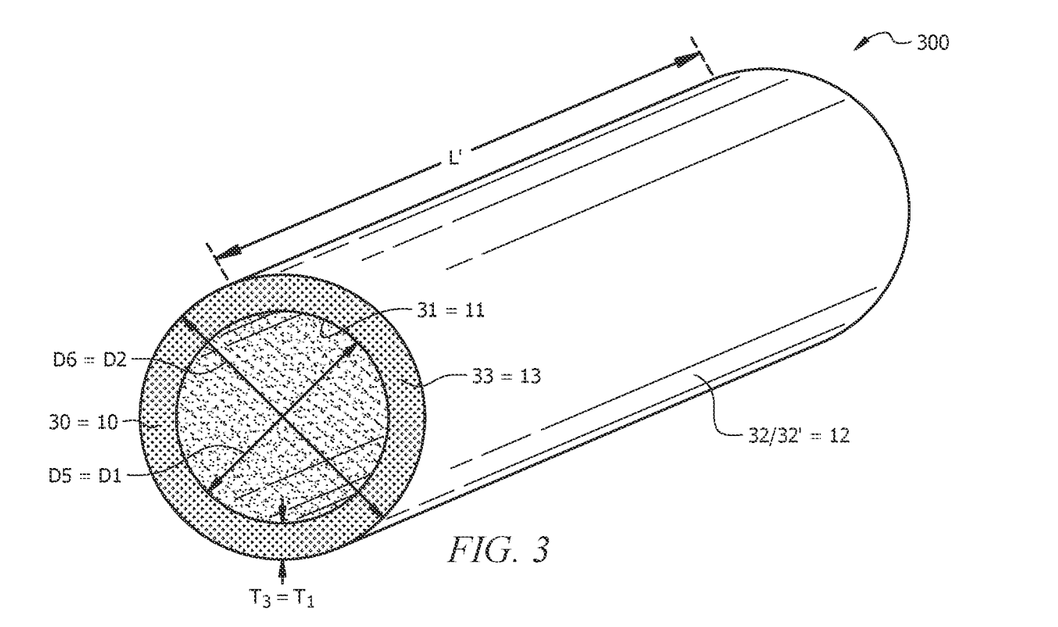
FIG. 3 is a schematic of a same pipe absent the outer layer, according to embodiments of this disclosure.

Reference to "core pipe" (or "core PE pipe") indicates the pipe (or a PE pipe) provided by inner layer 10 (or a PE inner layer 10), which is substantially equivalent to "same pipe" 300 of FIG. 3. The outer layer 20 can be referred herein to as a "shell" or providing a "shell" around inner layer 10. "Shell" indicates that outer layer 20 entirely covers an outside surface 12 of the inner layer 20, but is not a sleeve slipped over inner layer 10, but is coextruded with inner layer 10. Inner layer 10, outer layer 20, and same pipe 300 will be described in detail hereinbelow with reference to FIGS. 1-3.

Description of a pipe of this disclosure will now be made with reference to FIG. 1, which is a schematic of a pipe 100, according to embodiments of this disclosure, and FIG. 2, which is a schematic cross section 200 of the pipe of FIG. 1. Pipe 100 comprises: an inner layer 10 and an outer layer 20. The inner layer 10 comprises a first material 13 (also referred to as a "first composition") having a first hydrostatic design basis (HDB), while outer layer 20 comprises a second material 23 (also referred to as a "second composition) having a second HDB. The second HDB is greater than or equal to the first HDB. The pipe 100 is a coextruded pipe, wherein the outer layer 20 is coextruded with the inner layer 10. The first HDB and the second HDB are as specified in ASTM Test Method D2387.

HDB per ASTM D2837 predicts long-term strength ratings for a PE compound. The term Hydrostatic Design Basis (HDB) refers to the categorized long-term hydrostatic strength (LTHS) in the circumferential or hoop direction, for a given set of end use conditions, as established by the ASTM Test Method D2837, "Standard Test Method for Obtaining Hydrostatic Design Basis for Thermoplastic Pipe Materials." Hydrostatic Design Basis (HDB), which is one of a series of established stress values (specified in Test Method D2837) for a plastic compound obtained by categorizing the long-term hydrostatic strength determined in accordance with ASTM Method D2837. The procedure for estimating long-term hydrostatic strength is basically an extrapolation with respect to time of a stress-time regression line based on data obtained in accordance with the Test Method D1598. Stress failure time plots are obtained for the selected temperature and environment: the extrapolation is made in such a manner that the long-term hydrostatic strength is estimated for these conditions. For PE4710, HDB's are commonly established at 23° C. (73° F.) and 60° C. (140° F.) or 82° C. (180° F.). HDB's for intermediate temperatures may be established thru interpolation of HDB values per the method defined in PPI TR-3. The HDB is thus a material property that is obtained by evaluating stress rupture data derived from testing pipe made from the subject material. The LTHS is determined by analyzing stress versus time-to-rupture (i.e., stress-rupture) test data that covers a testing period of not less than 10,000 h and that is derived from sustained pressure testing of pipe made from the subject material. The data is analyzed by linear regression to yield a best-fit log-stress versus log time-to-fail straight-line equation. The HDB is the categorized intercept of the average long term hydrostatic strength at 100,000 hours (i.e., 11 years). For PE4710, the ASTM D2837 HDB is 1600 psi and the PPI TR-3 DF is 0.63, which yields a Hydrostatic Design Stress (HDS) of 1000 psi for water at 23° C. (73° F.).

Figure 1:
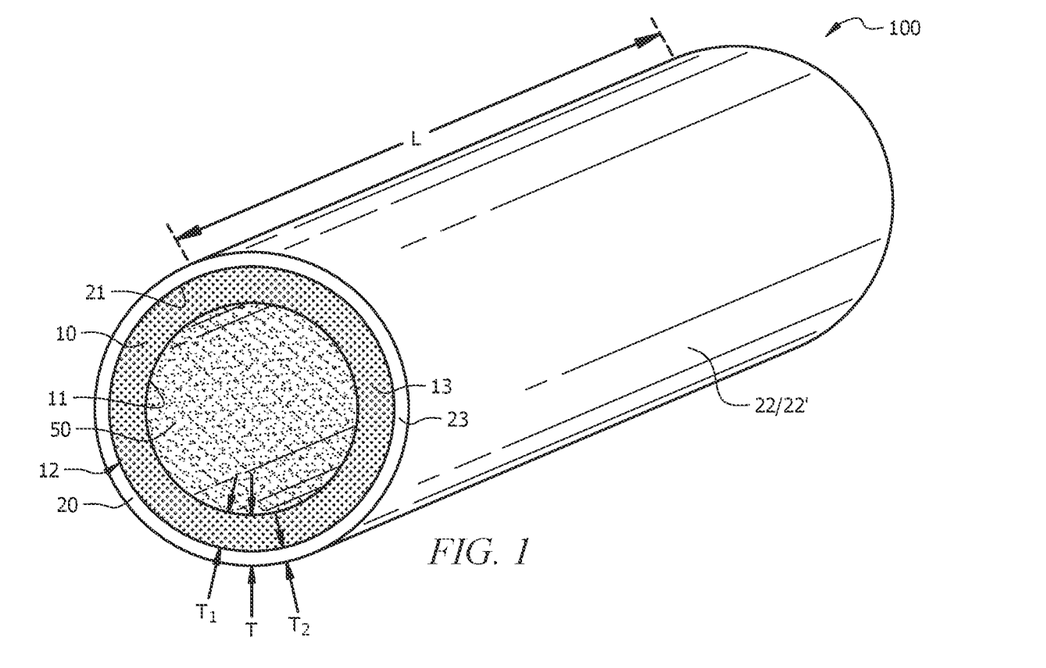
FIG. 1 is a schematic of a pipe, according to embodiments of this disclosure.

As depicted in FIG. 1, inner layer 10 has an inside surface 11 and an outside surface 12. Inside surface 11 of inner layer 10 defines an interior of the pipe (or "pipe interior") 50, through which fluid flows when the pipe 100 is being utilized in a piping application (e.g., an above-ground piping application). Outer layer 20 has an inside surface 21 and an outside surface 22, which provides the outside surface 22' of the pipe 100. Although not depicted in FIG. 1, in embodiments, one or more layers of a third material can be extruded and/or coated inside or outside inner layer 10, e.g., on inside surface 12 of inner layer 10 and/or outside surface 12 of inner layer 10, between inner layer 10 and outer layer 20.

As depicted in FIG. 2, inner layer 10 has an inside diameter D1 (e.g., an average inside diameter of inner layer 10 along length L of pipe 100) and an outside diameter D2 (e.g., an average outside diameter of inner layer 10 along length L of pipe 100). Outer layer 20 has an inside diameter D3 (e.g., an average inside diameter of outer layer 20 along length L of pipe 100) and an outside diameter D2 (e.g., an average outside diameter of outer layer 20 along length L of pipe 100). The outside diameter D2 of inner layer 10 is substantially equal to (i.e., slightly less than) the inside diameter D3 of outer layer 20, as the two layers (the inner layer 10 and the outer layer 20) are coextruded to be adjacent to one another.

With reference to FIG. 3, which is a schematic of a "same pipe" 300, as referenced herein, reference to a "same pipe" absent outer layer or shell 20 indicates a pipe 300 comprising a sole layer 30 equivalent to inner layer 10 of pipe 100 and no outer layer 20 and optionally any same one or more additional layers inside sole layer 30, wherein the inner layer has thickness T3 equal to thickness $T_1$ of pipe 100, inside diameter D5 equal to inside diameter D1 of pipe 100, outside diameter D6 equal to outside diameter D2 of pipe 100, inside surface 31 equivalent to inside surface 11 of pipe 100, and outside surface 32 equivalent to outside surface 12 of pipe 100, which outside surface 32, for the same pipe 300 is the outermost surface of the same pipe 300. Thus, although referred to as an 'inner' or "sole" layer 30 of the same pipe 300, the sole layer 30 of the same pipe 300 (which is equivalent to inner layer 10 of pipe 100) provides the outermost surface of the same pipe 300 which outermost surface comprises the outside surface 32 of the sole/inner layer 30 of the same pipe 300. Same pipe 300 can have a length L' equal to length L of pipe 100. Reference to "sole" layer 30 of same pipe indicates that the only layer of inner layer 10 and outer layer 20 of pipe 100 contained in same pipe 300 is sole layer 30, equivalent to inner layer 10 of pipe 100. That is, like pipe 100, same pipe 300 can also comprise one or more additional layers or coatings inside sole layer 30.

Inner layer 11 can have a thickness $T_1$ and outer layer 20 can have a thickness $T_2$. In embodiments, a thickness of the inner layer 10 is greater than or equal to a thickness of the outer layer 20. For example, the thickness $T_2$ of the outer layer 20 can be less than or equal to about 30, 25, 20, 15, 10, 9, 8, 7, 6, 5, 4, 3, 2, 1, or 0.5% of the thickness $T_1$ of the inner layer 10, e.g., the thickness $T_2$ of the outer layer 20 can be from about 0.5 to about 30, from about 1 to about 20, or from about 1 to about 10% of the thickness $T_1$ of the inner layer 10.

In embodiments, the inside diameter D1 of inner layer 10 of pipe 100 (and inside diameter D5 of sole layer 30 of same pipe 300) is in a range of from about 0.25 to about 1.27 m (from about 10 to about 50 inches), from about 0.25 to about 1.02 m (from about 10 to about 40 inches, from about 0.25 to about 0.76 m (from about 10 to about 30 inches), or greater than. less than, or equal to about 5, 10, 25, 20, 21, 22, 23, 24, 25, 26, 27, 28, 29, 30, or more inches). Generally, thickness T1 of inside layer 10 can be in the range of a few inches (e.g., about 0.5, 1, 2, 3, 4, 5 inches). The length L of pipe 100 (and length L' of same pipe 300) can be any suitable length, for example, joints having a length L of from about 1.5 to about 30.5 m (from about 5 to about 100 ft), from about 3.0 to about 30.5 m from about 10 to about 100 ft), from about 1.5 to about 15.2 m (from about 5 to about 50 ft), or greater than, less than, or equal to about 10, 20, 30, 40, or 50 ft (15.2 m).

In embodiments, sizing and weight of the pipe 100 (e.g., a White-Shell PE pipe 100) is calculated using a nominal thickness of outer layer 20 of 0.125-in (3.2 mm) on top of outside diameter D2 of inner layer 10.

The outer layer 20 can have a solar absorptivity ($\alpha_s$) under a set of environmental conditions that is less than a solar absorptivity of the inner layer under the same set of conditions. That is, the outer layer 20 can have a solar absorptivity ($\alpha_s$) under a set of environmental conditions that is less than a solar absorptivity of the outermost surface (e.g., outside surface 32 of sole layer 30) of the same pipe 300 (which comprises only the sole layer 30 equivalent to the inner layer 10 of pipe 100). In embodiments, the outer layer 20 of pipe 100 can have a solar absorptivity ($\alpha_s$) under a set of environmental conditions that is less than a solar absorptivity of a black outer layer under the same set of conditions. The solar absorptivity ($\alpha_s$) is a measure of how much solar radiation is absorbed by a material, while solar emissivity ($\varepsilon$), discussed further in Example 2, is a measure of how effectively a material emits radiation. The ratio ($\alpha_s/\varepsilon$) of these two properties has engineering significance, whereby a smaller value of $\alpha_s/\varepsilon$ indicates improved heat rejection, which translates to a lower surface temperature of the pipe. In embodiments, pipe 100 has a $\alpha_s/\varepsilon$ ratio that is less than about 1.0, 0.9, 0.8, 0.7, 0.6, 0.5, 0.4, or 0.3.

In embodiments, a pipe 100 has a white PE4710 outer layer 20 and a black inner layer 10, and has a solar absorptivity ($\alpha_s$) of less than or equal to about 0.5, 0.45, 0.4, 0.35, or 0.3, a solar emissivity ($\varepsilon$) of less than or equal to about 0.95, 0.94, 0.93, 0.92, or 0.91, and/or a $\alpha_s/\varepsilon$ ratio of less than or equal to about 0.5, 0.45, or 0.4; in specific embodiments, the pipe 100 has a solar absorptivity ($\alpha_s$) of about 0.35, a solar emissivity ($\varepsilon$) of about 0.91, and/or a $\alpha_s/\varepsilon$ ratio of about 0.4.

The outer layer or shell 20, can be made out of a pressure-rated material, but can be designed to be non-pressure rated over the core (e.g., PE) pipe provided by inner layer 10. In this manner, a pressure-rated (e.g., white) compound can be utilized as the second material 23 of outer layer 20, which can serve as a "sacrificial" layer to increase longevity of the pipe 100 (e.g., and of the core pipe provided by inner layer 10) in service. Due to potential weatherability concerns around using a non-black pigment subject to UV exposure, in embodiments, a pipe 100 of this disclosure comprises a non-black (e.g., white) shell designed/provided as an outer layer 20 on top of a pressure-rated core PE pipe provided by inner layer 10. This increased thickness (i.e., provided by the thickness $T_2$ of outer layer 20) provides additional wear resistance (e.g., resistance to external abrasion) and potentially provides additional longevity of the overall pipe 100 when subject to the design working pressures that the core (e.g., PE) pipe is designed to hold.

The outer layer 20 is non-black. In embodiments, the outer layer 20 of pipe 100 is white or a shade of white (e.g., having little or no hue (e.g., "achromatic") and reflecting and scattering substantially all visible wavelengths of light). In embodiments, the inner layer 10 is black or a shade of black (e.g., having little or no hue (e.g., "achromatic") and absorbing substantially all visible wavelengths of light). In embodiments, the outer layer 20 of pipe 100 is white or a shade of white, and the inner layer 10 is black or a shade of black. In embodiments, the first material 13 of pipe 100 (which is equivalent to the material 33 of sole layer 33 of same pipe 300), the second material 23 of pipe 100, or both comprise polyethylene (PE). In embodiments, both the first material 13 of pipe 100 (which is equivalent to the material 33 of sole layer 33 of same pipe 300), and the second material 23 of pipe 100 comprise PE. In embodiments, the first material 13 of pipe 100 (which is equivalent to the material 33 of sole layer 33 of same pipe 300) and the second material 23 of pipe 100 are substantially the same except for pigments thereof. In embodiments, the first material 13 of inner layer 10 of pipe 100 (which is equivalent to the material 33 of sole layer 33 of same pipe 300) comprises polyethylene-raised temperature (PE-RT), polyethylene resistant to cracking (PE-RC), PE2708, PE4710, PE4710 PE-RT, PE100, PE100+, PE100-RC, or a combination thereof. In embodiments, the second material 23 of outer layer 20 of pipe 100 comprises polyethylene-raised temperature (PE-RT), polyethylene resistant to cracking (PE-RC), PE2708, PE4710, PE4710 PE-RT, PE100, PE100+, PE100-RC, or a combination thereof. In embodiments, the second material 23 of outer layer 20 of pipe 100 comprises PE4710 or PE4710 PE-RT. In embodiments, the second material 23 of outer layer 20 of pipe 100 comprises PE4710 White Compound. For example, in embodiments, outer layer or shell 20 comprises a white PE4710 material, such as, without limitation, DOW DGDA CONTINUUM™2490-WH, available from Dow Chemical. In embodiments, inner layer 10 comprises MARLEX® TRB-437 LS, available from Chevron Phillips Chemical. In embodiments, outer layer or shell 20 comprises a white PE4710 material, such as, without limitation, DOW DGDA CONTINUUM™2490-WH, available from Dow Chemical, and inner layer 10 comprises MARLEX® TRB-437 LS, available from Chevron Phillips Chemical.

In embodiments, the first material 13 of pipe 100 (which is equivalent to the material 33 of sole layer 33 of same pipe 300) and the second material 23 of pipe 100 comprise PE4710 or PE4710 PE-RT. In specific embodiments, outer layer 20 comprises a pressure or non-pressure rated white PE compound as a non-pressure rated layer over a core of black PE pipe provided by inner layer 10; for example, outer layer 20 can be utilized as a sacrificial white shell on a core PE2708 pipe provided by inner layer 10. In embodiments, outer layer 20 can be utilized as a sacrificial white shell on a core PE4710 PE-RT pipe provided by inner layer 10. In embodiments, outer layer 20 can be utilized as a sacrificial white shell on a core PE100 pipe provided by inner layer 10. In embodiments, outer layer 20 can be utilized as a sacrificial white shell on core PE100+ pipe provided by inner layer 10. In embodiments, outer layer 20 can be utilized as a sacrificial white shell on core PE100-RC pipe provided by inner layer 10.

As noted above, the (e.g., white) outer layer or shell 20, albeit made out of a pressure-rated material, can be designed to be non-pressure rated over the core (e.g., PE) pipe provided by inner layer 10. This can provide the benefits of a non-black (e.g., white) outside surface 22' of the pipe 100 to minimize solar absorption, with an increased wall thickness to promote the longevity of the (PE) pipe 100. Accordingly, wall thickness T of pipe 100, equal to $T_1+T_2$, can be greater than wall thickness $T_3$ of same pipe 300, as wall thickness $T_3$ of same pipe 300 is equal to the thickness $T_1$ of inside layer 10 of pipe 100. When the thickness $T_1$ of the core pipe provided by inner layer 10 of pipe 100 (which is equal to wall thickness T3 of sole layer 30 of same pipe 300) provides the design or working pressure rating, the additional thickness provided by thickness $T_2$ of outer layer 20 of pipe 100 (comprising the second material 23 having the second HDB greater than or equal to first HDB) thus provides increased total wall thickness T, and pipe 100 can have an effective working pressure rating greater than that of the core pipe provided by inner layer 10 (said core pipe equivalent to same pipe 300 of FIG. 3), which effective working pressure is thus also greater than that of same pipe 300, which is equivalent to the core pipe provided by inner layer 10 of pipe 100.

The (e.g., white PE) shell provided by the outer layer 20 of pipe 100 is designed to reduce overall solar absorptivity when compared to black (e.g., PE) pipe. This lower solar absorptivity translates to lower pipe surface temperatures, reduced effect on pressure capability, reduced rate of attack from certain oxidizing chemicals and reduced thermal expansion and contraction.

In embodiments, during an above-ground application, a maximum temperature of outside or outermost surface 22' of the pipe 100 (which is the outside surface 22 of outer layer 20), an average temperature of the outside surface 22' of the pipe 100, a maximum fluid temperature of a fluid in the pipe 100, an average fluid temperature of the fluid in the pipe 100, a thermal expansion of the pipe 100, a thermal contraction of the pipe 100, or a combination thereof is less than or equal to the maximum temperature of the outside or outermost surface 32' of a same pipe 300 absent the outer layer 20 (which outside surface 32' of the same pipe 300 is the outside surface 32 of sole layer 30 which is equivalent to outside surface 12 of inner layer 10 of pipe 100), the average temperature of the outside surface 32' of the same pipe 300 absent the outer layer 20, the maximum fluid temperature of the fluid in the same pipe 300 absent the outer layer 20, the average fluid temperature of the fluid in the same pipe 300 absent the outer layer 20, the thermal expansion of the same pipe 300 absent the outer layer 20, the thermal contraction of the same pipe 300 absent the outer layer 20, or the combination thereof of the same pipe 300 absent the outer layer 20.

The above-ground application can comprise any piping application above-ground, but the pipe 100 of this disclosure can be particularly beneficial for such above-ground piping applications where temperature variations (e.g., daily temperature variations of greater than or equal to about 10, 15, 20, 25, or 30° C. or more) are large or the temperature is very hot (e.g., average daily temperatures of greater than or equal to about 20 to about 40° C., from about 25 to about 40° C., from about 30 to about 40° C., or greater than or equal to about 20, 25, 30, 35, or 40° C.

In embodiments, the above-ground application has a working pressure rating, and the inner layer 10 of the pipe 100 provides a core pipe (equivalent to same pipe 300 absent the outer layer 20) that has a pressure rating (equivalent to the same pipe pressure rating) greater than or equal to the working pressure rating, such that the pipe 100 has a pressure rating of greater than the working pressure rating. The pressure rating of the pipe 100 can be at least 1, 2, 3, 4, 5, 6, 7, 8, 9, 10, 15, or 20% greater than the working pressure rating for the above-ground application, as the inner layer 10 has a pressure rating of at least the working pressure rating needed for the above-ground application, and outer layer 20 of pipe 100 can provide for an increased effective pressure rating of pipe 100.

Also disclosed herein is a method of making a pipe 100 for an above-ground application. Description of the method of making pipe 100 will now be provided with reference to FIG. 4, which is a schematic of a method 400 of making a pipe 100, according to embodiments of this disclosure.

Figure 4:
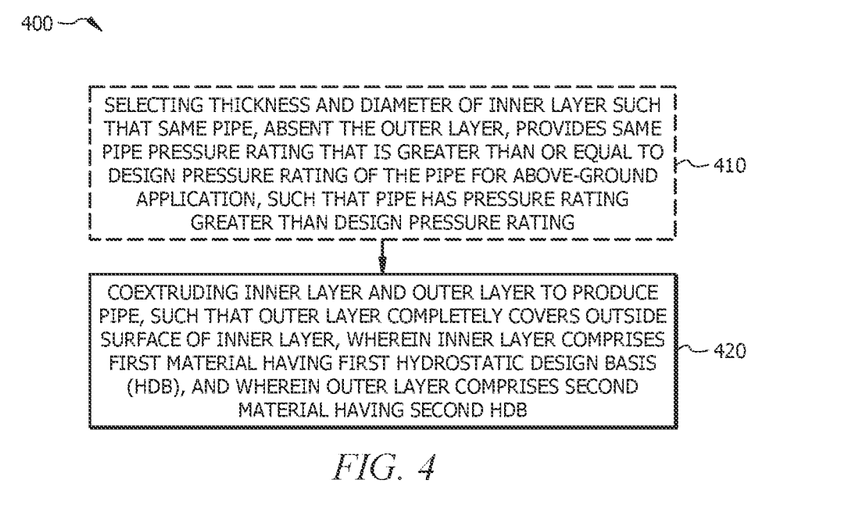
FIG. 4 is a schematic of a method of making a pipe, according to embodiments of this disclosure.

Method 400 comprises coextruding, at 420, inner layer 10 and outer layer 20 to produce the pipe 100, such that the outer layer 20 completely covers an outside surface 12 of the inner layer 10. As detailed above, the inner layer 10 comprises first material 13 having the first hydrostatic design basis (HDB), and outer layer 20 comprises second material 23 having a second HDB, wherein the second HDB is greater than or equal to the first HDB. The first HDB and the second HDB are as specified in ASTM Test Method D2387, described hereinabove.

In embodiments, method 400 can further comprise, as indicated at 410, selecting a thickness $T_1$ and diameter (e.g., inside diameter D1 and/or outside diameter D2) of the inner layer 10 of pipe 100 such that a core pipe provided by inner layer 10 (said core pipe equivalent to same pipe 300, absent the outer layer 20), provides a same pipe pressure rating that is greater than or equal to a design pressure rating of the pipe for the above-ground application, such that the pipe 100 has a pressure rating greater than the design pressure rating. Stated differently, method 400 can further comprise selecting a thickness $T_1$ and diameter (e.g., inside diameter D1 and/or outside diameter D2) of the inner layer 10, at 410, such that inner layer 10 provides for a working pressure rating of pipe 100 that is greater than or equal to the design pressure rating required for the above-ground application, such that pipe 100 has a pressure rating greater than the design pressure rating due to the presence of outer layer 20.

Figure 5:
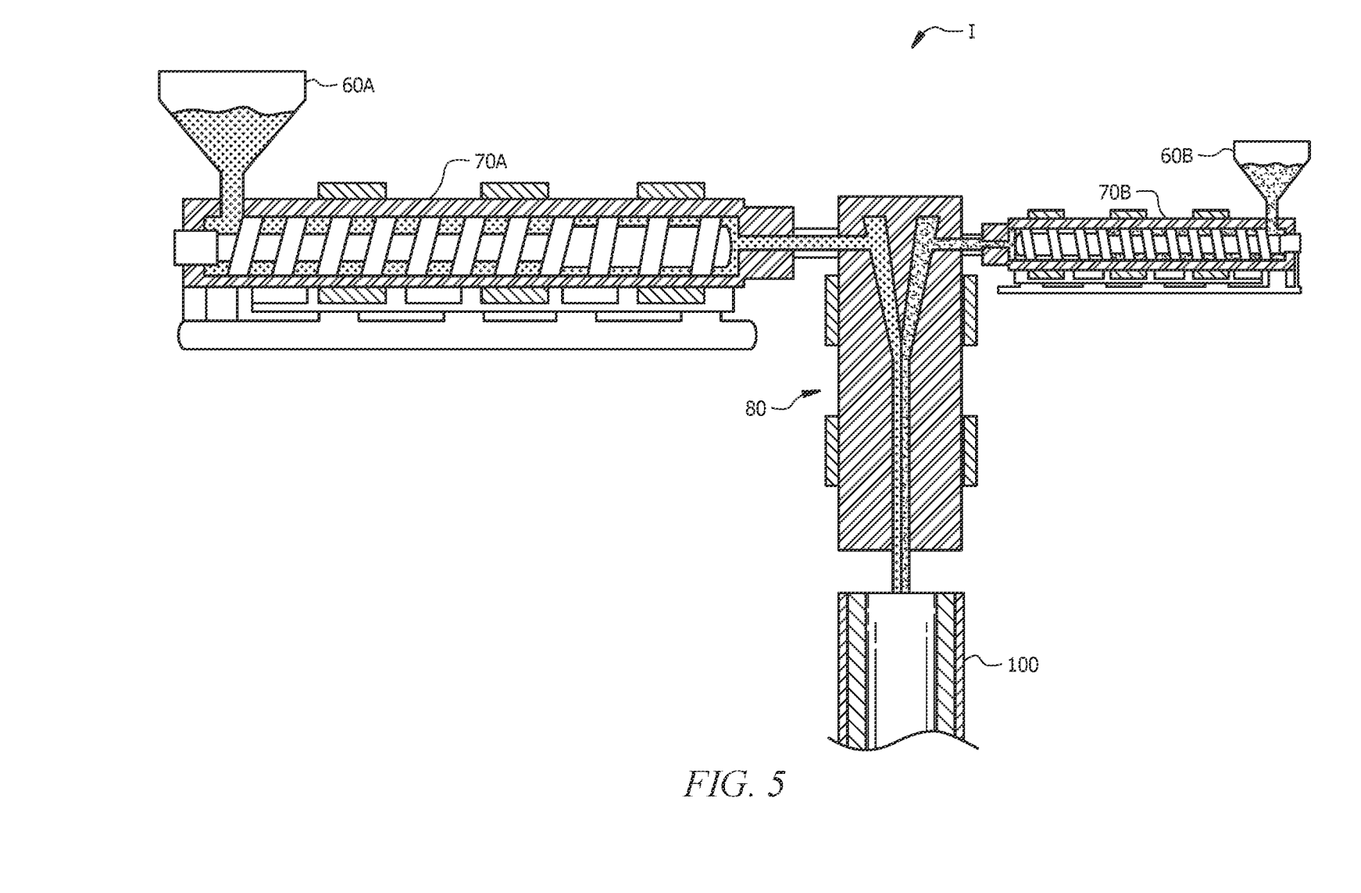
FIG. 5 is a schematic of a coextrusion system suitable for carrying out the method of FIG. 4, according to embodiments of this disclosure.

The coextrusion of the inner layer 10 and the outer layer 20 to provide pipe 100 can be effected via any suitable coextrusion methods. For example, with reference to FIG. 5, which is a schematic of an extruder system 1 suitable for carrying out the method of FIG. 4, coextruding, at 420, can further comprise: feeding, to a primary or first extruder 70A, (a) natural pellets and a first masterbatch comprising a concentrate of a first pigment and/or (b) pellets comprising the first pigment at a first weight ratio to provide the first material 13; feeding, to a secondary or second extruder 70B, (c) natural pellets and a second masterbatch comprising a concentrate of a second pigment and/or (d) pellets comprising the second pigment at a second weight ratio to provide the second material; and coextruding the first material 13 and the second material 23 through a die 80 (e.g., a multi-manifold die) to produce the pipe 100. Components of (a) and/or (b) can be fed to first extruder 70A via a first hopper 60A, and components (c) and/or (d) can be fed to second extruder 70B via a second hopper 60B.

As noted hereinabove, the outer layer 20 is non-black. The second pigment(s) is selected to provide the non-black color of outer layer 20 of pipe 100. In embodiments, the second pigment(s) is white or a shade of white (e.g., having little or no hue (e.g., "achromatic") and reflecting and scattering substantially all visible wavelengths of light) or produces an outer layer 20 that is white or a shade of white. The inner layer can be any color. In embodiments, the core pipe provided by inner layer 10 of pipe 100 is black or a shade of black. In such embodiments, the first pigment(s) can be black or a shade of black (e.g., having little or no hue (e.g., "achromatic") and absorbing substantially all visible wavelengths of light) or can produce an inner layer 10 that is black or a shade of black. In embodiments, the first pigment, the second pigment, or both do not comprise cadmium, lead, mercury and/or hexavalent chrome. In embodiments, the first pigment, the second pigment, or both do not comprise cadmium, lead, mercury and/or hexavalent chrome. In embodiments, the first pigment, the second pigment, or both do not comprise a detectable amount of cadmium, lead, mercury and/or hexavalent chrome. In embodiments, the first pigment, the second pigment, or both comprise equal to or less than 0.1, 0.01, 0.001, 0.0001, 0.00001, 0.000001, or 0.0000001 weight percent cadmium, lead, mercury and/or hexavalent chrome.

In embodiments, a coextruded pipe 100 of this disclosure comprises a first layer 10, a second layer 20, or both a first layer 10 and second layer 20 comprise equal to or less than 0.1, 0.01, 0.001, 0.0001, 0.00001, 0.000001, or 0.0000001 weight percent cadmium, lead, mercury and/or hexavalent chrome.

Pipe 100 can be produced with an external (e.g., white) shell or outer layer 20 made out of a PE4710 (e.g., white compound) that is simultaneously co-extruded with the core (e.g., PE) pipe provided by inner layer 10. In applications that require pressure, the pipe 100 can be designed so that the core (e.g., PE) pipe provided by inner layer 10 contains the pressure and the white shell or outer layer 20 is treated as a non-pressure rated shell to cover the (e.g., PE) pipe provided by inner layer 10. The core (e.g., PE) pipe provided by inner layer 10 can be manufactured using approved (e.g., PE) formulations and to (e.g., ductile iron pipe sizes/iron pipe sizes (DIPS/IPS)) sizing requirements in accordance with the ASTM standard to which it is being manufactured (e.g. ASTM F714, ASTM F2619). The co-extruded (e.g., white) shell or outer layer 20 can be made using a pressure-rated (e.g., PE4710 white) compound, that provides adequate (e.g., substantially complete) coverage around the core PE pipe. Desirably, the outer layer 20 entirely covers the outside surface 12 of the inner layer 10 of pipe 100. In embodiments, outer layer 20 covers at least 80, 85, 90, 91, 92, 93, 94, 95, 96, 97, 98, 99, or 100% of outside surface 12 on inner layer 10 of pipe 100. In embodiments, outer layer 20 covers from 80 to 100, from 85 to 100, from 90 to 100, from 95 to 100, from 96 to 100, from 97 to 100, from 98 to 100, from 99 to 100, or substantially 100% of outside surface 12 of inner layer 10 of pipe 100. In embodiments, the co-extrusion 420 of method 400 can be performed using a standard extruder and co-extruder equipment set up.

Figure 6:
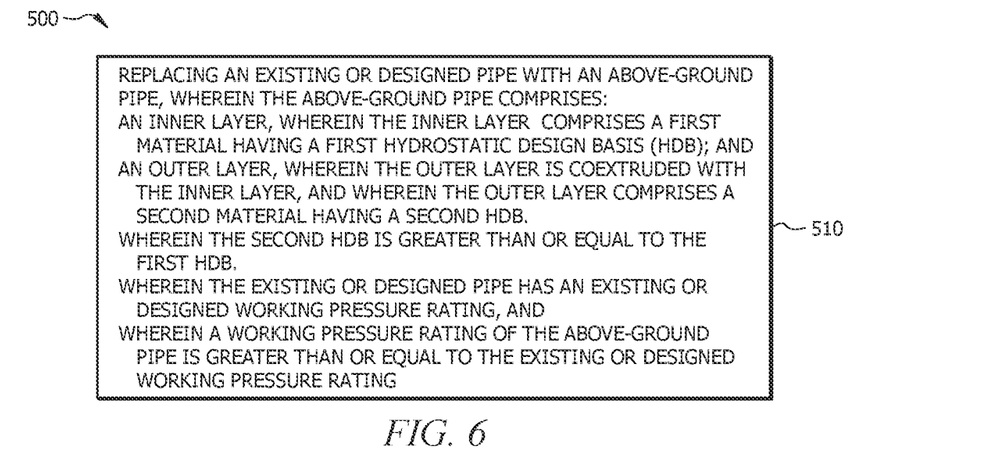
FIG. 6 is a schematic of a method of designing or retrofitting a pipe, according to embodiments of this disclosure.

Also provided herein is a method of retrofitting an existing or designed pipe with a pipe 100 of this disclosure. Such a method will now be described with reference to FIG. 6, which is a schematic of a method 500 of designing or retrofitting a pipe with a pipe 100 of this disclosure, according to embodiments of this disclosure. Method 500 comprises: replacing an existing or designed pipe with an above-ground pipe 100 of this disclosure comprising: an inner layer 10, wherein the inner layer 10 comprises a first material 13 having a first hydrostatic design basis (HDB); and an outer layer 20, wherein the outer layer 20 is coextruded with the inner layer 10, and wherein the outer layer 20 comprises a second material 23 having a second HDB, wherein the second HDB is greater than or equal to the first HDB, wherein the first HDB and the second HDB are as specified in ASTM Test Method D2387, and wherein the existing or designed pipe has an existing or designed working pressure rating and wherein a working pressure rating of the above-ground pipe 100 is greater than or equal to the existing or designed working pressure rating.

The above-ground pipe can be as described hereinabove for pipe 100, and can be produced via the method 400 described with reference to FIG. 4. For example, the outer layer 20 of the above-ground pipe 100 can have a solar absorptivity ($\alpha_s$) under a set of environmental conditions that is less than a solar absorptivity of a black outer layer under the same set of conditions. The outer layer 20 is non-black. For example, in embodiments, the outer layer 20 can be white or a shade of white. The inner layer 10 can be any color, e.g., black or a shade of black.

Method 500 can further comprise a step like step 420 of method 400 comprising selecting the inner layer 10 such that a same pipe 300 absent the outer layer 20 has a same pipe pressure rating greater than or equal to the existing or designed working pressure rating, such that the above-ground pipe 100 has a pressure rating of greater than the existing or designed working pressure rating. That is, in embodiments, the working pressure rating of the above-ground pipe 100 is greater than the existing or designed working pressure rating, as the core pipe (equivalent to the same pipe 300, absent the outer layer 20) provided by inner layer 10 of the above-ground pipe 100 provides a working pressure rating of the core pipe that is greater than or equal to the existing or designed working pressure rating, and outer layer 20 of the above-ground pipe increases the effective working pressure rating of the above-ground pipe 100 to above the existing or designed working pressure rating.

In embodiments, the above-ground pipe is designed such that, during an above-ground application employing the above-ground pipe 100, a maximum temperature of an outer or outermost surface 22' of the above-ground pipe 100 (which is equivalent to outside surface 22 of outer layer 20 of the above-ground pipe 100), an average temperature of the outer surface 22' of the above-ground pipe 100, a maximum fluid temperature of a fluid in the above-ground pipe 100, an average fluid temperature of the fluid in the above-ground pipe 100, a thermal expansion of the above-ground pipe 100, a thermal contraction of the above-ground pipe 100, or a combination thereof is less than or equal to the maximum temperature of the outer or outermost surface of the existing or designed pipe, the average temperature of the outer surface of the existing or designed pipe, the maximum fluid temperature of the fluid in the existing or designed pipe, the average fluid temperature of the fluid in the existing or designed pipe, the thermal expansion of the existing or designed pipe, the thermal contraction of the existing or designed pipe, or the combination thereof of the existing or designed pipe.

In embodiments, as noted hereinabove, the first material 13, the second material 23, or both can comprise polyethylene (PE). For example, the first material 13 can comprise polyethylene-raised temperature (PE-RT), polyethylene resistant to cracking (PE-RC), PE2708, PE4710, PE4710 PE-RT, PE100, PE100+, PE100-RC, or a combination thereof, and/or the second material 23 can comprise PE4710 or PE4710 PE-RT.

The system and method of this disclosure may provide a number of benefits relative to conventional piping. Without limitation, a number of potential advantages will be outlined hereinbelow.

A (e.g., white) shell or outer layer 20 can be co-extruded across many core pipe (e.g., provided by inner layer 10; said core pipe equivalent to same pipe 300 of FIG. 3). In embodiments, this (white-shell or white) outer layer 20 to be co-extruded over 1800 Series Polyethylene-Raised Temperature (PE-RT) pipe, which is a black pipe with a maximum operating temperature of 180° F. (54.9° C.), which can provide advantages in harsher environments.

The outer layer 20 provides that the pipe 100 surface temperature (i.e., the temperature of outside surface 22' of pipe 100) is reduced relative to a same pipe 300 absent the outer layer 20, thus providing for a reduced effect on pressure capability of the pipe 100. The outer layer 20 also provides for reduced thermal expansion and contraction, and/or reduced abrasion due to less 'snaking' relative to a same pipe 300 absent the outer layer 20.

Furthermore, utilization of a pipe 100 of this disclosure obviates the need for painting of a pipe (e.g., white) to help mitigate fluctuations in temperature, thus facilitating efforts of the end-user.

Due to potential weatherability concerns around using a non-black pigment (e.g., a white pigment) subject to UV exposure, in embodiments, outer layer 20 is designed/provided as a (e.g., white) shell on top of a pressure-rated core (e.g., PE) pipe provided by inner layer 10 of pipe 100. The increased thickness provided by thickness $T_2$ of outer layer 20 of pipe 100 provides additional wear resistance (e.g., resistance to external abrasion) and can potentially provide additional longevity of the overall pipe 100 when subject to the design pressures that the core (e.g., PE) pipe (said core pipe equivalent to same pipe 300 absent outer layer 20 of pipe 100) is designed to hold.

A pipe 100 of this disclosure can provide for reduced abrasion due to less 'snaking', coupled with thicker overall wall (e.g., having overall thickness T) associated with pressure-rated (e.g., black) core pipe provided by inner layer 10 and the non-pressure rated (e.g., white) shell provided by outer layer 20 of pipe 100. By non-pressure rated here is meant that the pipe 100 is designed such that the design/needed pressure rating is met in its entirety by the core pipe provided by the inner layer 10, such that the pipe 100 comprising the inner layer 10 and the outer layer 20 has an effective pressure rating greater than the design/needed pressure rating.

Other advantages will be apparent to those of skill in the art and with the help of this disclosure.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Coextrusion, as defined by ASTM F412, is a process whereby two or more heated or unheated plastic material streams forced through one or more shaping orifice(s) become one continuously formed piece. In this Example 1, a Pipe 100 of this disclosure is formed by coextrusion, and comprises an inner layer 10 comprising a black PE4710, and an outer layer 20 comprising a white PE4710. Outside diameter D4 (of the outer layer 20) of Pipe 100 can be 12.75 inches (0.32 ft) and the inside diameter (of inside layer 10) can be 10.43 inches (0.26 m) (DR=11).

Example 2

In this Example 2, solar thermal modeling was used to compare the performance of a "White Pipe", as described in Example 1 and comprising an inventive pipe 100 comprising a white outer layer 20 coextruded over a black inner layer 10 and a comparative "Black Pipe" comprising a same pipe 300 comprising a black sole layer 30. The expected steady-state temperature profiles of both the Black Pipe and the White PE Pipe of this disclosure when exposed to the sun were assessed.

The solar absorptance (also referred to herein as the "solar absorptivity") ($\alpha_s$) and thermal emissivity (also referred to herein as emissivity) ($\varepsilon$) of the Black Pipe having the black outside surface 32' and the White Pipe comprising a white outside surface 22' were determined using ASTM test methods.

The pipe outer diameter of each of the Black Pipe and the White Pipe was 12.75" (0.32 m) and the inside diameter of each of the Black Pipe and the White Pipe was 10.43" (0.26 m) (DR=11). The pipe wall thickness was 1.16" (0.03 m) and a ten foot (3.0 m) segment of pipe was utilized, buried 10% in the ground.

A computational fluid dynamics (CFD) model was employed to solve for the conduction, convection (internal) and radiation heat transfer. Conditions employed included ambient conditions for a typical "hot" summer day in Charlotte, NC, an air temperature of 95° F., a water temperature of 82° F., flowing in the pipe, and zero wind velocity. The time of day was selected to produce the highest solar load on the piping. Model assumptions for worst case scenario included quasi-steady state, no (i.e., 0) wind velocity, summer (June 21), Charlotte, NC, a sunshine factor of 0.76, a diffuse fraction of 0.12, a ground-pipe conduction, a high ambient temperature of 95° F. (35° C.), and a water (Lake Norman) temperature of 82° F. (27.8° C.).

Methods and standards utilized for the testing the solar absorptance and emissivity were compliant to ANSI/NCSLZ540-3-2006 (R2013). The absorptance was measured in accordance to ASTM E903, and the emissivity measured in accordance to ASTM E408.

Table 1 shows the results of the absorptivity and emittance testing.

TABLE 1

Solar Absorptivity and Emittance Results of Example 2

| Pipe | Solar Absorptivity ($\alpha_s$) ASTM E903 at Air Mass 1.5 | Thermal Emittance ($\varepsilon$) ASTM E408 at 300K |
|---|---|---|
| Black Pipe | 0.947 | 0.905 |
| White Pipe | 0.347 | 0.911 |

As seen in Table 1, the White Pipe, having the white outside surface 22', absorbed significantly less incident solar load than the Black Pipe, having the black outside surface 32'. The Black Pipe absorbed more solar irradiation than the White Pipe due to its higher absorptivity. The expected highest incident solar load in Charlotte, NC, is at the summer solstice at solar noon on Jun. 21, 2021 at 12:26 pm. The highest outer surface pipe temperatures occurred for the Black Pipe. When a 7 mph cross wind was implemented, the maximum temperature on the outside surface 32' of the Black Pipe (filled with air) reduced from 201° F. to 165° F.

Figure 7:
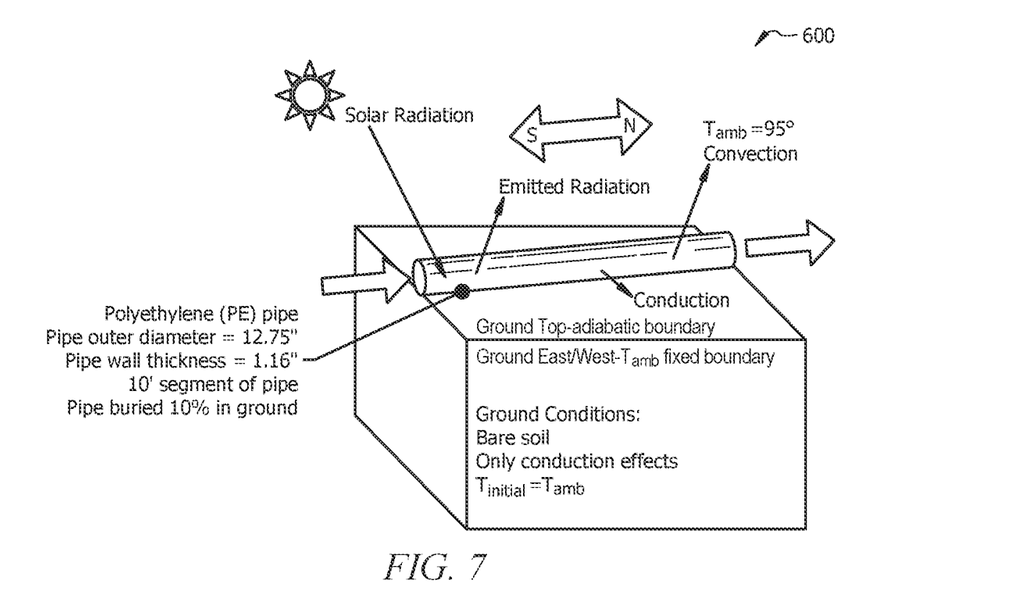
FIG. 7 is a schematic of a model setup utilized for the thermal model of Example 2.

FIG. 7 is a schematic of the Model Setup 600 utilized for the thermal model. The thermal model utilized steady-state, solar load determined using the ASHRAE clear sky model, external surface—convection heat transfer coefficient, Morgan correlation for long horizontal cylinders by (Eq. 1):

$$\overline{h} = \frac{\overline{Nu_D}k}{D} = \frac{0.125 \, Ra_D^{0.333} k}{D} \text{ for } 10^7 < Ra_D < 10^{12}, \quad \text{(Eq. 1)}$$

and internal pipe surface—convection explicitly solved in CFD model.

The Solar Load Model, Max Irradiation assumed solar noon (12:26 pm) on Jun. 21, 2021, in Charlotte, NC (35.22° N, −80.96° W), solar radiative heating dependent on: angle of isolation, area of incident surface, angle of isolation variation with time of day, time of year, and latitude. For a sphere or cylinder, the angle of isolation does not affect area of incident surface until the ground becomes involved, while for a box, max radiation occurs shortly before or after solar noon due to maximization of area of incident surface.

Table 2 shows parameters utilized in the thermal model.

TABLE 2

Parameters Utilized in Thermal Model of Example 2

| Material | Density (kg/m³) | Thermal Conductivity (W/m-K) | Specific Heat (J/kg-K) |
|---|---|---|---|
| Soil | 2050 | 0.52 | 1840 |
| Polyethylene (PE) | 940 | 0.45 | 1900 |

Four cases, Case A, Case B, Case C, and Case D were studied. Case B and Case D utilized the White Pipe having the white outside surface 22', while Case A and Case C utilized the Black Pipe having the black outside surface 32'. Cases A and B utilized stagnant internal air (e.g., stagnant air within the pipe interior 50), while Case C and Case D had flowing water from Lake Norman having a temperature of 82° F. (27.8° C.).

Table 3 shows operating conditions employed in the modeling.

TABLE 3

Operating Conditions for Thermal Modeling of Example 2

| CASE | PIPE COLOR | FLUID | FLUID VELOCITY ((ft/s)/(m/s)) | Inlet Temp.. (° F./° C.) |
|---|---|---|---|---|
| A | Black | Air | 0/0 | 95/35 |
| B | White | Air | 0/0 | 95/35 |
| C | Black | Water | 2/0.61 | 82/28.3 |
| D | White | Water | 2/0.61 | 82/28.3 |

Table 4 provides the results of the thermal modeling.

TABLE 4

Results of Thermal Modeling of Example 2

| CASE | Pipe Outside Surface Color | Fluid | Outer Pipe Max. Temp. (° F./° C.) | Outer Pipe Avg. Temp (° F./° C.) | Pipe Mid-Wall Max. Temp. (° F./° C.) | Inner Pipe Max. Temp. (° F./° C.) | Inner Pipe Avg. Temp. (° F./° C.) | Max Fluid Temp. (° F./° C.) | Fluid Avg. Temp. (° F./° C.) |
|---|---|---|---|---|---|---|---|---|---|
| A | Black | Air | 201/94.4 | 157/69.4 | 192/89.4 | 182/83.3 | 152/66.7 | 181/82.8 | 148/64.4 |
| B | White | Air | 143/61.7 | 123/50.6 | 139/59.4 | 135/56.7 | 135/57.3 | 135/57.2 | 119/48.3 |
| C | Black | Water | 155/68.3 | 120/48.9 | 122/50 | 84/38.9 | 82/27.8 | 82/27.8 | 82/27.8 |
| D | White | Water | 115/46.1 | 100/37.8 | 100/37.8 | 83/28.3 | 82/27.8 | 82/27.8 | 82/27.8 |

Figure 8A:
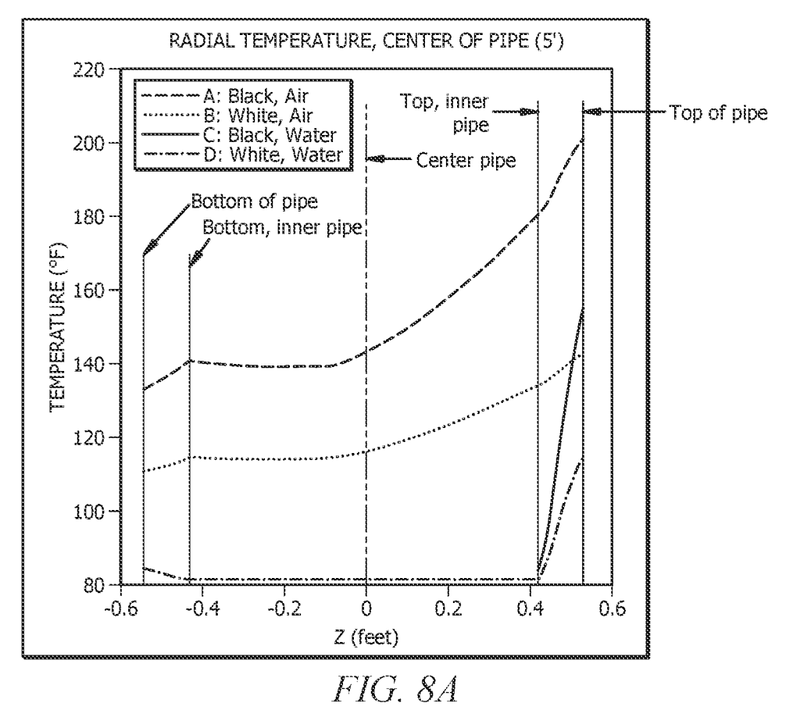
FIG. 8A shows the radial temperature at the center of the pipe (5 ft (1.5 m)) as a function of the radial distance, for Case A, Case B, Case C, and Case D of Example 2.
Figure 8B:
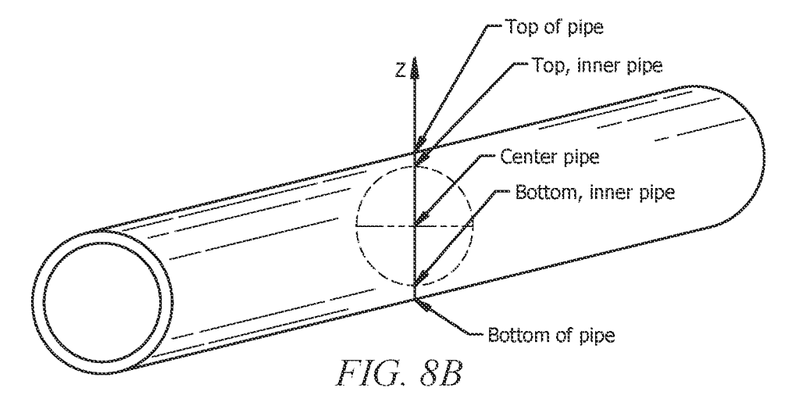
FIG. 8B is a schematic showing the locations indicated by "top of pipe", "top, inner pipe", "center pipe", "bottom, inner pipe", and "bottom of pipe" in FIG. 8A.

FIG. 8A shows the radial temperature at the center of the pipe (5'/1.5 m) as a function of the radial distance, for Case A, Case B, Case C, and Case D. FIG. 8B is a schematic showing the locations indicated by "top of pipe", "top, inner pipe", "center pipe", "bottom, inner pipe", and "bottom of pipe" in FIG. 8A.

The impact of a 7 mph cross flow wind was analyzed for Case A (black pipe filled with air). The cross flow reduced the maximum pipe temperature from 201° F. (93.9° C.) to 165° F. (73.9° C.), as seen in Table 4.

TABLE 4

Impact of Cross Flow Wind in Example 2

| Case | PIPE COLOR | FLUID | Outer Pipe Max. Temp. (° F./° C.) | Pipe Mid-Wall Max. Temp. (° F./° C.) | Fluid Avg. Temp. (° F./° C.) |
|---|---|---|---|---|---|
| A | Black | Air | 201/94.4 | 192/89.4 | 148/64.4 |
| A (7 mph wind) | Black | Air | 165/73.9 | 159/70.6 | 52.8 |

The expected highest incident solar load in Charlotte, NC, is on Jun. 21, 2021 at 12:26 pm. In no wind conditions, the peak pipe temperature of 201° F. (94.4° C.) occurs on the outer surface 32' of the Black Pipe when filled with stagnant air. When a 7 mph cross wind is implemented, the peak temperature reduces to 165° F. (73.9° C.). The stagnant air temperature increases substantially from ambient temperature, while the flowing water temperature has negligible temperature increase in the 10 foot (3.0 m) section of either the Black Pipe of the White Pipe. The results of this Example 2 demonstrate that a PE pipe 100 including a white shell or outer layer 20 PE pipe can be utilized to reduce surface temperature of the outside surface 22' of the pipe 100 relative to an outside surface 32' temperature of a same pipe 300 absent the white outer layer 20.

Surprisingly, based on the thermal modeling and environmental conditions of Example 2, with 82° F. (27.8° C.) water flowing through the pipe, the surface temperature of the Black Pipe reaches remarkably close to a standard PE4710 maximum operating temperature of 140° F. (60° C.), while the White shell Pipe is well within the range for operating temperatures for a standard PE4710.

ADDITIONAL DESCRIPTION

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

The following are non-limiting, specific embodiments in accordance with the present disclosure:

In a first embodiment, a pipe comprises: an inner layer, wherein the inner layer comprises a first material having a first hydrostatic design basis (HDB); and an outer layer, wherein the outer layer is coextruded with the inner layer, and wherein the outer layer comprises a second material having a second HDB, wherein the second HDB is greater than or equal to the first HDB, wherein the first HDB and the second HDB are as specified in ASTM Test Method D2387.

A second embodiment can include the pipe of the first embodiment, wherein the second material has a solar absorptivity ($\alpha_s$) under a set of environmental conditions that is less than a solar absorptivity of a black outer layer under the same set of conditions.

A third embodiment can include the pipe of the first or the second embodiment, wherein the outer layer is white or a shade of white.

A fourth embodiment can include the pipe of any one of the first to third embodiments, wherein, during an above-ground application, a maximum temperature of a surface of the pipe, an average temperature of the surface of the pipe, a maximum fluid temperature of a fluid in the pipe, an average fluid temperature of the fluid in the pipe, a thermal expansion of the pipe, a thermal contraction of the pipe, or a combination thereof is less than or equal to the maximum temperature of the surface of a same pipe absent the outer layer, the average temperature of the surface of the same pipe absent the outer layer, the maximum fluid temperature of the fluid in the same pipe absent the outer layer, the average fluid temperature of the fluid in the same pipe absent the outer layer, the thermal expansion of the same pipe absent the outer layer, the thermal contraction of the same pipe absent the outer layer, or the combination thereof of the same pipe absent the outer layer.

A fifth embodiment can include the pipe of the fourth embodiment, wherein the above-ground application has a working pressure rating, and wherein the inner layer provides that the same pipe absent the outer layer has a same pipe pressure rating greater than or equal to the working pressure rating, such that the pipe has a pressure rating of greater than the working pressure rating.

A sixth embodiment can include the pipe of the fifth embodiment, wherein the pressure rating of the pipe is at least 1, 2, 3, 4, 5, 6, 7, 8, 9, 10, 15, or 20% greater than the working pressure rating.

A seventh embodiment can include the pipe of any one of the first to sixth embodiments, wherein the first material, the second material, or both comprise polyethylene (PE).

An eighth embodiment can include the pipe of the seventh embodiment, wherein both the first material and the second material comprise PE.

A ninth embodiment can include the pipe of any one of the first to eighth embodiment, wherein the inner layer is black or a shade of black.

A tenth embodiment can include the pipe of any one of the first to ninth embodiments, wherein the first material comprises polyethylene-raised temperature (PE-RT), polyethylene resistant to cracking (PE-RC), PE2708, PE4710, PE4710 PE-RT, PE100, PE100+, PE100-RC, or a combination thereof.

An eleventh embodiment can include the pipe of the tenth embodiment, wherein the second material comprises PE4710 or PE4710 PE-RT.

A twelfth embodiment can include the pipe of any one of the first to eleventh embodiments, wherein a thickness of the inner layer is greater than or equal to a thickness of the outer layer.

A thirteenth embodiment can include the pipe of the eleventh or twelfth embodiment, wherein the thickness of the outer layer is less than or equal to about 20, 15, 10, 9, 8, 7, 6, 5, 4, 3, 2, 1, or 0.5% of the thickness of the inner layer.

In a fourteenth embodiment, a method of making a pipe for an above-ground application comprises: coextruding an inner layer and an outer layer to produce the pipe, such that the outer layer completely covers an outside of the inner layer, wherein the inner layer comprises a first material having a first hydrostatic design basis (HDB), and wherein the outer layer comprises a second material having a second HDB, wherein the second HDB is greater than or equal to the first HDB, wherein the first HDB and the second HDB are as specified in ASTM Test Method D2387; and wherein a thickness and diameter of the inner layer are selected such that a same pipe, absent the outer layer, provides a same pipe pressure rating that is greater than or equal to a design pressure rating of the pipe for the above-ground application, such that the pipe has a pressure rating greater than the design pressure rating.

A fifteenth embodiment can include the method of the fourteenth embodiment, wherein coextruding further comprises: feeding, to a primary extruder, (a) natural pellets and a first masterbatch comprising a concentrate of a first pigment and/or (b) pellets comprising the first pigment at a first weight ratio to provide the first material; feeding, to a secondary extruder, (c) natural pellets and a second masterbatch comprising a concentrate of a second pigment and/or (d) pellets comprising the second pigment at a second weight ratio to provide the second material; and coextruding the first material and the second material through a die to produce the pipe.

A sixteenth embodiment can include the method of the fifteenth embodiment, wherein the second pigment is white or a shade of white, and/or wherein the first pigment is black or a shade of black.

A seventeenth embodiment can include the method of the fifteenth or the sixteenth embodiment, wherein the first pigment, the second pigment, or both do not comprise cadmium, lead, mercury or hexavalent chrome.

An eighteenth embodiment can include the method of any one of the fourteenth to seventeenth embodiments, wherein the outer layer has a solar absorptivity ($\alpha s$) under a set of environmental conditions that is less than a solar absorptivity of a black outer layer under the same set of conditions.

A nineteenth embodiment can include the method of any one of the fourteenth to eighteenth embodiments, wherein the above-ground application has a working pressure rating, and further comprising selecting a geometry of the inner layer such that a same pipe absent the outer layer has a same pipe pressure rating greater than or equal to the working pressure rating, and the pipe has a pressure rating of greater than the working pressure rating.

A twentieth embodiment can include the method of any one of the fourteenth to nineteenth embodiments, wherein, during the above-ground application, a maximum temperature of a surface of the pipe, an average temperature of the surface of the pipe, a maximum fluid temperature of a fluid in the pipe, an average fluid temperature of the fluid in the pipe, a thermal expansion of the pipe, a thermal contraction of the pipe, or a combination thereof is less than or equal to the maximum temperature of the surface of the same pipe absent the outer layer, the average temperature of the surface of the same pipe absent the outer layer, the maximum fluid temperature of the fluid in the same pipe absent the outer layer, the average fluid temperature of the fluid in the same pipe absent the outer layer, the thermal expansion of the same pipe absent the outer layer, the thermal contraction of the same pipe absent the outer layer, or the combination thereof of the same pipe absent the outer layer.

A twenty first embodiment can include the method of any one of the fourteenth to twentieth embodiments, wherein the first material, the second material, or both comprise polyethylene (PE).

A twenty second embodiment can include the method of any one of the fourteenth to twenty first embodiments, wherein the first material comprises polyethylene-raised temperature (PE-RT), polyethylene resistant to cracking (PE-RC), PE2708, PE4710, PE4710 PE-RT, PE100, PE100+, PE100-RC, or a combination thereof.

A twenty third embodiment can include the method of the twenty second embodiment, wherein the second material comprises PE4710 or PE4710 PE-RT.

In a twenty fourth embodiment, a method comprises: replacing an existing or designed pipe with an above-ground pipe comprising: an inner layer, wherein the inner layer comprises a first material having a first hydrostatic design basis (HDB); and an outer layer, wherein the outer layer is coextruded with the inner layer, and wherein the outer layer comprises a second material having a second HDB, wherein the second HDB is greater than or equal to the first HDB, wherein the first HDB and the second HDB are as specified in ASTM Test Method D2387, and wherein the existing or designed pipe has an existing or designed working pressure rating and wherein a working pressure rating of the above-ground pipe is greater than or equal to the existing or designed working pressure rating.

A twenty fifth embodiment can include the method of the twenty fourth embodiment, wherein the outer layer has a solar absorptivity ($\alpha s$) under a set of environmental conditions that is less than a solar absorptivity of a black outer layer under the same set of conditions.

A twenty sixth embodiment can include the method of the twenty fourth or twenty fifth embodiment, wherein the outer layer is white or a shade of white, and/or wherein the inner layer is black or a shade of black.

A twenty seventh embodiment can include the method of any one of the twenty fourth to twenty seventh embodiments further comprising selecting the inner layer such that a same pipe absent the outer layer has a same pipe pressure rating greater than or equal to the existing or designed working pressure rating, such that the above-ground pipe has a pressure rating of greater than the existing or designed working pressure rating.

A twenty eighth embodiment can include the method of any one of the twenty fourth to twenty seventh embodiments, wherein, during an above-ground application employing the above-ground pipe, a maximum temperature of a surface of the above-ground pipe, an average temperature of the surface of the above-ground pipe, a maximum fluid temperature of a fluid in the above-ground pipe, an average fluid temperature of the fluid in the above-ground pipe, a thermal expansion of the above-ground pipe, a thermal contraction of the above-ground pipe, or a combination thereof is less than or equal to the maximum temperature of the surface of the existing or designed pipe, the average temperature of the surface of the existing or designed pipe, the maximum fluid temperature of the fluid in the existing or designed pipe, the average fluid temperature of the fluid in the existing or designed pipe, the thermal expansion of the existing or designed pipe, the thermal contraction of the existing or designed pipe, or the combination thereof of the existing or designed pipe.

A twenty ninth embodiment can include the method of any one of the twenty fourth to twenty eighth embodiments, wherein the first material, the second material, or both comprise polyethylene (PE).

A thirtieth embodiment can include the method of any one of the twenty fourth to twenty ninth embodiments, wherein the first material comprises polyethylene-raised temperature (PE-RT), polyethylene resistant to cracking (PE-RC), PE2708, PE4710, PE4710 PE-RT, PE100, PE100+, PE100-RC, or a combination thereof.

A thirty first embodiment can include the method of the thirtieth embodiment, wherein the second material comprises PE4710 or PE4710 PE-RT.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A pipe consisting of:
    an inner layer, wherein the inner layer comprises a first material having a first hydrostatic design basis (HDB); and
    an outer layer, wherein the outer layer is coextruded with the inner layer, and wherein the outer layer comprises a second material having a second HDB,
    wherein the second HDB is greater than or equal to the first HDB, wherein the first HDB and the second HDB are as specified in ASTM Test Method D2387.

2. The pipe of claim 1, wherein the second material has a solar absorptivity ($\alpha_s$) under a set of environmental conditions that is less than a solar absorptivity of a black outer layer under the same set of conditions.

3. The pipe of claim 2, wherein, in an above-ground application having a working pressure rating, the inner layer provides that the same pipe absent the outer layer has a same pipe pressure rating greater than or equal to the working pressure rating, such that the pipe has a pressure rating of greater than the working pressure rating.

4. The pipe of claim 3, wherein the pressure rating of the pipe is at least 1% greater than the working pressure rating.

5. The pipe of claim 4, wherein the thickness of the outer layer is less than or equal to about 20% of the thickness of the inner layer.

6. The pipe of claim 5, wherein the first material, the second material, or both comprise polyethylene (PE).

7. The pipe of claim 6, wherein the outer layer is white or a shade of white, the inner layer is black or a shade of black, or both.

8. The pipe of claim 1, wherein the outer layer is white or a shade of white, the inner layer is black or a shade of black, or both and wherein the outer layer has a solar absorptivity ($\alpha_s$) under a set of environmental conditions that is less than a solar absorptivity of the inner layer under the same set of conditions.

9. The pipe of claim 8, wherein the thickness of the outer layer is less than or equal to about 20% of the thickness of the inner layer.

10. The pipe of claim 9, wherein the first material, the second material, or both comprise polyethylene (PE).

11. The pipe of claim 10, wherein the inner layer comprises PE-4710, PE-100, or a combination thereof and the outer layer comprises PE-4710, PE-100, PE-1000RC, or combinations thereof.

* * * * *